(12) United States Patent
Nomizu (10) Patent No.: US 7,477,788 B2
(45) Date of Patent: Jan. 13, 2009

(54) IMAGE PROCESSING APPARATUS, IMAGE READING APPARATUS AND IMAGE FORMING APPARATUS

(75) Inventor: Yasuyuki Nomizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1228 days.

(21) Appl. No.: 10/641,049

(22) Filed: Aug. 15, 2003

(65) Prior Publication Data

US 2004/0105587 A1 Jun. 3, 2004

(30) Foreign Application Priority Data

Aug. 20, 2002 (JP) ............................. 2002-239665

(51) Int. Cl.
G06K 9/36 (2006.01)
(52) U.S. Cl. ..................................... 382/232
(58) Field of Classification Search .................. 382/232, 382/240; 348/231.1
See application file for complete search history.

(56) References Cited

U.S. PATENT DOCUMENTS

| 5,297,220 | A | 3/1994 | Nomizu |
| 6,041,144 | A | 3/2000 | Sugiura |
| 6,265,997 | B1 | 7/2001 | Nomizu |
| 6,298,173 | B1 | 10/2001 | Lopresti |
| 6,301,391 | B1 | 10/2001 | Nomizu |
| 6,885,395 | B1 * | 4/2005 | Rabbani et al. .......... 348/231.1 |
| 2001/0050778 | A1 | 12/2001 | Fukuda et al. |
| 2002/0097326 | A1 | 7/2002 | Kuroiwa |
| 2003/0095272 | A1 | 5/2003 | Nomizu |
| 2003/0137695 | A1 | 7/2003 | Nomizu |

FOREIGN PATENT DOCUMENTS

| EP | 0 585 524 | 3/1994 |
| EP | 1 158 764 A2 | 11/2001 |
| JP | 5-75871 | 3/1993 |
| JP | 7-7621 | 1/1995 |

(Continued)

OTHER PUBLICATIONS

A. Skodras, et al., IEEE Signal Processing Magazine, vol. 18, No. 5, XP-001059421, pp. 36-58, "The JPEG 2000 Still Image Compression Standard", Sep. 2001.

(Continued)

*Primary Examiner*—Tom Y Lu
(74) *Attorney, Agent, or Firm*—Oblon, Spivak, McClelland, Maier & Neustadt, P.C.

(57) ABSTRACT

An image processing apparatus for processing image data is described. The image processing apparatus comprises:
a compression/decompression part for compressing the image data into code data having a plurality of kinds of formats and decompressing the code data into the image data, the plurality of kinds of formats comprise at least a reversible encoding method and an irreversible encoding method of a JPEG 2000 format; and
a conversion part for performing a conversion of a format of the code data from one format in the plurality of kinds of data formats to another format in the plurality of kinds of data formats using the compression/decompression part, the conversion comprises a conversion of the format of the code data from the reversible encoding method into the irreversible encoding method or from the irreversible encoding method into the reversible encoding method of the JPEG 2000 format.

24 Claims, 10 Drawing Sheets

FOREIGN PATENT DOCUMENTS

| | | |
|---|---|---|
| JP | 7-111596 | 4/1995 |
| JP | 9-69947 | 3/1997 |
| JP | 9-168092 | 6/1997 |
| JP | 9-216349 | 8/1997 |
| JP | 2002-176561 | 6/2002 |

OTHER PUBLICATIONS

Heico Neumeyer, "Photoshop 7.0 für Windows und Macintosh", Markt +Technik Verlag, XP-001091539, Aug. 15, 2002 pp. 215-263.

* cited by examiner

IMAGE PROCESSING APPARATUS, IMAGE READING APPARATUS AND IMAGE FORMING APPARATUS

BACKGROUND OF THE INVENTION

1. Field of the Invention

The present invention generally relates to an image processing apparatus, an image reading apparatus and an image forming apparatus.

2. Description of the Related Art

Japanese Laid-Open Patent Application No. 5-75871 discloses a color copying apparatus in which if an external computer can only handle compression data in a standard mode, compression data in an original mode that is internally used in the color copying apparatus is converted into the compression data in the standard mode and the converted compression data with compression parameters are supplied to the external computer.

Japanese Laid-Open Patent Application No. 9-168092 discloses a technology in which if input image data can not be compressed to aimed quantity of the data by means of a variable length reversible compression process, then the input image data is compressed by means of a variable length irreversible compression process.

Japanese Laid-Open Patent Application No. 9-216349 discloses a technology for storing data in a memory in which if a quantity of compressed document codes exceeds a predetermined value when document data is compressed by means of a variable length reversible compression process and then the compressed document codes are stored in a memory, then the document data is rasterized again with a resolution that is normally used to print document data, and the rasterized data is divided into a certain size of the data and the divided data is compressed by means of the variable length irreversible compression process, and the compressed data is stored in the memory.

According to the technology described in the Japanese Laid-Open Patent Application No. 5-75871, it is possible to output the compressed data in the standard mode by converting the compression data in the original mode into the compression data in the standard mode even if the color copying apparatus internally handles the compression data in the original mode. Therefore, it is possible to view images stored in the color copying apparatus on a display of the external computer.

However, such technology has a disadvantage in that it is not possible to easily perform the process that converts the compression data in the original mode into the compressed data in the standard mode by means of a simple construction and a simple process.

SUMMARY OF THE INVENTION

It is a general object of the present invention to provide an image processing apparatus, an image reading apparatus and an image forming apparatus in which one or more of the above disadvantages are eliminated.

Further, it is another object of the present invention to achieve a conversion of compression data compressed by one compression method into compression data compressed by another compression method by means of a simple construction and a simple process.

The above objects of the present invention are achieved by an image processing apparatus for processing image data.

According to an aspect of the present invention, an image processing apparatus includes:

a compression/decompression part for compressing the image data into code data having a plurality of kinds of formats and decompressing the code data into the image data, the plurality of kinds of formats comprise at least a reversible encoding method and an irreversible encoding method of a JPEG 2000 format; and a conversion part for performing a conversion of a format of the code data from one format in the plurality of kinds of data formats to another format in the plurality of kinds of data formats using the compression/decompression part, the conversion comprises a conversion of the format of the code data from the reversible encoding method into the irreversible encoding method or from the irreversible encoding method into the reversible encoding method of the JPEG 2000 format.

According to the present invention, it is possible to provide a conversion with a simple construction and a simple process, because it is possible to change a compression method between a reversible compression method and an irreversible compression method in the same process method when a conversion between data compressed using a reversible compression method of the JPEG2000 format and data compressed using an irreversible compression method of the JPEG2000 format is performed.

An image processing apparatus may further include:

an output part for externally outputting the code data having the format converted by the conversion part.

According to the present invention, it is possible for the external computer to easily use the image data because the image data is converted to the standard format and is output externally.

In an embodiment of the invention, the image processing apparatus is in communication with a storage apparatus for storing image data, the image processing apparatus further comprises:

a code storage part for storing the code data in the storage apparatus, wherein the code storage part causes the compression/decompression part to encode the image data with the reversible encoding method into the code data and stores the code data in the storage apparatus if a memory capacity of the storage apparatus is greater than a predetermined threshold value, and the code storage part causes the compression/decompression part to encode the image data with the irreversible encoding method into the code data and stores the code data in the storage apparatus if the memory capacity of the storage apparatus is less than or equal to the predetermined threshold value.

According to the present invention, it is possible to store the optimal image while the data capacity of the storage apparatus is being saved because the encoding method is selectable according to a memory capacity of the storage apparatus.

According to another embodiment of the invention, the image processing apparatus is in communication with a storage apparatus for storing image data, the image processing apparatus further comprises:

a first code storage part for storing the code data in the storage apparatus, wherein the first code storage part causes the compression/decompression part to encode the image data stored in the storage apparatus with the reversible encoding method into the code data and stores the code data in the storage apparatus;

a rewrite part that stops the first code storage part and converts a format of the code data stored in the storage apparatus into a format of the code data corresponding to the irreversible encoding method using the conversion part if unused memory space of the storage apparatus is less than a first predetermined threshold value, after the first code storage part started storing; and a second code storage part for storing the code data in the storage apparatus, wherein the second code storage part restarts the compression/decompression part to encode a remaining part of the image data with the irreversible encoding method into the code data and stores the code data in the storage apparatus if the unused memory space of the storage apparatus is greater than a second predetermined threshold value that is greater than the first predetermined threshold value, after the rewrite part started converting.

According to the present invention, it is possible to make a memory space in the storage apparatus without deleting the stored codes from the storage apparatus because the encoding method that can encode the images with a highest quality is selected and the encoded codes are stored until the storage apparatus becomes full, and if the storage apparatus becomes full, the stored codes are converted into the data encoded with the irreversible compression method and the remaining images are encoded with the irreversible compression method and stored in the storage apparatus.

According to yet another embodiment of the invention, the image processing apparatus may further include:

an acceptance part for accepting a selection for selecting an image data that is desired by a user from the image data stored in the storage apparatus if the unused memory space of the storage apparatus is smaller than the first predetermined threshold value, after the first code storing part started storing, and the rewrite part converts a format of the image data stored in the storage apparatus that is selected according to the selection accepted by the acceptance part into a format of the image data corresponding to the irreversible encoding method using the conversion part.

According to the present invention, it is possible to optimally save image data according to the user preference.

According to an aspect of the invention, there is provided an image reading apparatus including:

a photoelectric conversion device that reads an image of a document;

a storage apparatus that stores image data of read image of the document; and the image processing apparatus as described above that processes at least a part of image data that is input to the image reading apparatus and output from the image reading apparatus.

According to the present invention, it is possible to achieve an image reading apparatus that has the same effects as described herein.

According to still another aspect of the invention, there is provided an image forming apparatus including:

the image reading apparatus as described above; and a printer engine that forms an image that is read by the photoelectric conversion device on a paper.

According to the present invention, it is possible to achieve an image forming apparatus that has the same effects as described herein.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Hereafter, the first embodiment of the present invention will be explained.

Figure 1:
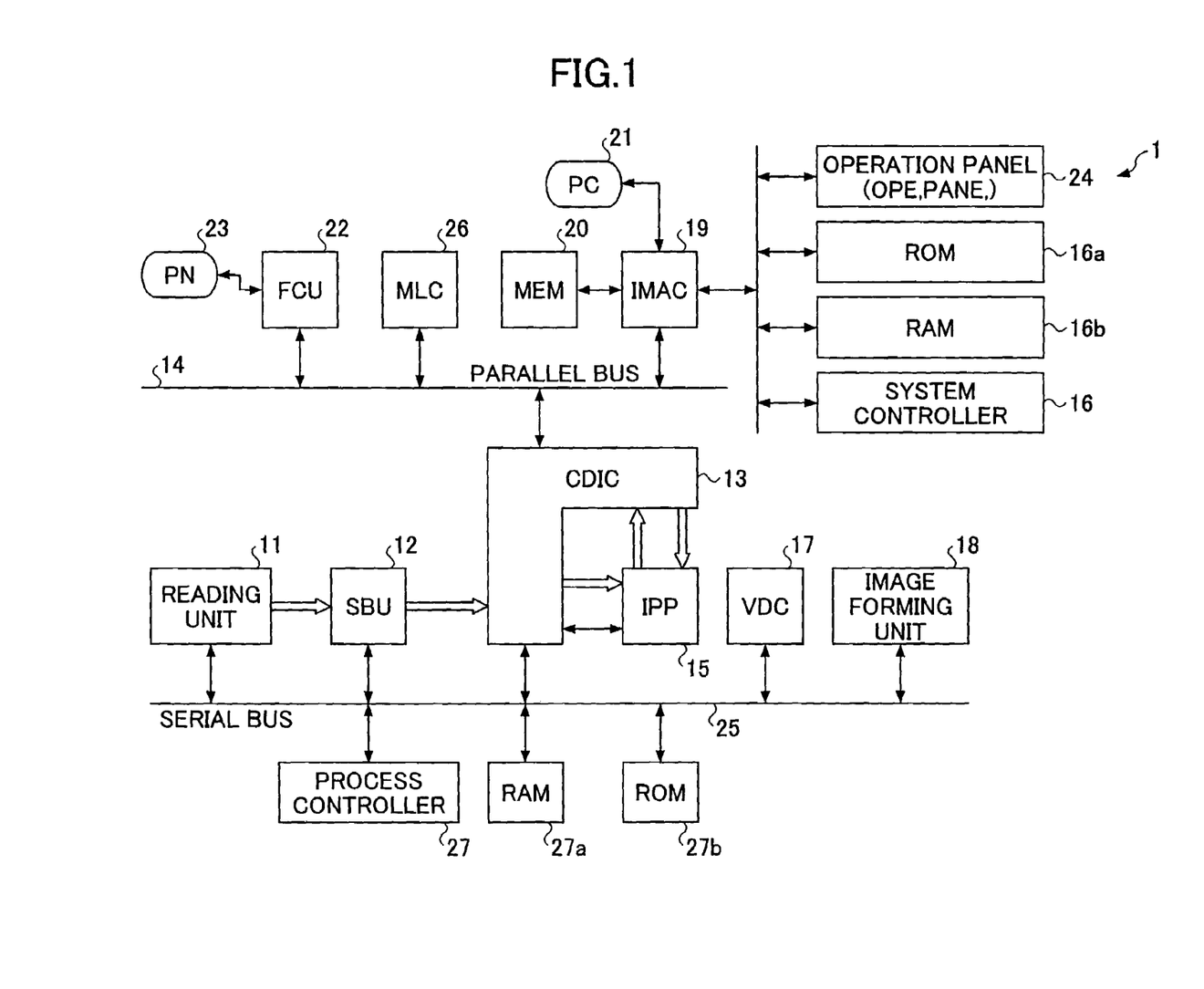
FIG. 1 shows a block diagram of a copying apparatus of a first embodiment of the present invention.

FIG. 1 is a block diagram that shows an electrical connection among elements in the copying apparatus 1 of the embodiment of the image forming apparatus of the present invention. A reading unit 11, which is a scanner for optically reading a document, focuses reflected light from a document, which light is irradiated from a lamp to the document, on a photoelectric conversion device, such as a CCD (charge coupled device). The photoelectric conversion device is provided on an SBU (sensor board unit) 12 and an image signal converted into the electrical signal by the photoelectric conversion device is converted to a digital signal and then the digital signal is output from the SBU 12 as an image signal. The image signal output from the SBU 12 is supplied to a CDIC (compression/decompression and data interface control part) 13. Transmission of the image data between function devices and data buses is controlled by the CDIC 13. The CDIC 13 controls the data transmission of the image data among the SBU 12, a parallel bus 14, an IPP (image processing processor) 15 and controls the communication between a system controller (CPU) 16 that controls the system and a process controller 27 for the image data. Reference numerals 16a and 16b show a ROM and a RAM that are used by the system controller 16. The image signal from the SBU 12 is transferred to the IPP 15 through the CDIC 13 and degradation of the signal caused by the optical system and quantization due to the digital image signal (the signal degradation in the scanner system) is corrected, and then the corrected signal is output to the CDIC 13.

In the illustrated exemplary copying apparatus 1, two kinds of jobs can be performed, one of which stores the read image that is read by the reading unit 11 into a memory whereby the stored image may be reused and another of which does not store the image into the memory. Each of the two jobs will be explained below. In the case that the image data is stored in the memory, such as the case that the same document is copied to a plurality of copies, the reading unit 11 reads the document once and the read document is stored in the memory and then, the stored data may be read multiple times from the memory for making multiple copies. In the case that the image data is not stored in the memory, such as the case that one document is copied to one copy, the read image is printed as it is, therefore, it is not needed to access the memory.

In the case that the image data is not stored in the memory, the transferred image data from the IPP 15 to the CDIC 13 is returned to the CDIC 13 to the IPP 15 again. The IPP 15 performs an image quality processing to convert luminance data from the photoelectric conversion device into a tone by density of each element. After the image quality processing is performed, the image data is transferred from the IPP 15 to a VDC (video data control) 17. Then, a post process for dot allocation and a pulse control for dot reproduction is performed on the signal converted into the tone by density of each element. Then, the reproduced image is formed on a transfer paper by an image forming unit 18, which may be a printer engine, for example, to form an image by means of an electronic photography method. In the image forming unit 18, various methods can be used, such as an ink-jet method, a sublimation dye thermal transfer method, a silver bromide photograph method and/or a melting thermal transfer method as well as the electronic photography method.

Next, the flow of the image data will be explained in the case of additional processing, wherein rotation of the image or synthesis of the image is performed when the image is read from the memory that stores the image data. The data transferred from the IPP 15 to the CDIC 13 is transferred from the CDIC 13 to the IMAC (image memory access control) 19 via the parallel bus 14. In the IMAC 19, under the control of the system controller 16, an access control of the image data to the MEM (memory module) 20 that is a storage apparatus, development of the image data to be used for printing to an external PC (personal computer) and compression/decompression of the image data for efficiently using the MEM 20 are performed. The image data transferred to the IMAC 19 is compressed and then is stored in the MEM 20, from which the stored data may be read as desired or needed. The read image data is decompressed into the original image data and transferred from the IMAC 19 to the CDIC 13 through the parallel bus 14.

After the image data is transferred from the CDIC 13 to the IPP 15, image quality processing and pulse control are performed on the image data by the VDC 17. Then, an image is formed on the transfer paper according to the image data in the image forming unit 18.

This copying apparatus 1 is a complex apparatus and has a FAX transmission function. The FAX transmission function performs image processing for the read image data in the IPP 15 and then transfers the processed image data to an FCU (FAX control unit) 22 through the CDIC 13 and the parallel bus 14. The FCU 22 performs a data conversion of the transferred data into data for transferring over a communication network and transmits it to the PN (public data network) 23 as FAX data. When the FAX data is received, the data received from the PN 23 is converted into the image data by the FCU 22 and the image data is transferred to the IPP 15 through the parallel bus 14 and the CDIC 13. In this case, the image quality processing is not performed and the dot re-allocation and the pulse control are performed by the VDC 17 and then, the reproduced image is formed on the transfer paper by the image forming unit 18.

When a plurality of jobs, such as a copy function, a FAX transmission and reception function, and a printer output function are operated in parallel, the system controller 16 and the process controller 27 control allocation of the access rights of the image reading unit 11, the image forming unit 18 and the parallel bus 14 with respect to each job.

The process controller (CPU) 27 controls the flow of image data, and the system controller 16 controls the system and manages start-up of the resources. Reference numerals 27a, 27b show a ROM and a RAM that the process controller 27 may use.

A user may select a function from the various kinds of functions by entering a selection input to the operational panel 24 to set the function, such as the copying function, or the FAX function, for example.

The system controller 16 and the process controller 27 communicate with each other via the parallel bus 14, the CDIC 13 and a serial bus 25. During communication, data format conversion is performed in the CDIC 13 at the interface between the parallel bus 14 and the serial bus 25.

An MLC (Media Link Controller) 26 performs a code conversion function of the image data as compression/decompression means and conversion means. According to an embodiment of the invention, the data conversion from data encoded by means of the encoding methods used in the CDIC 13 and the IMAC 19 into data encoded by means of other encoding methods, for example, the JPEG method that is one of standard methods, may be performed.

Figure 2:
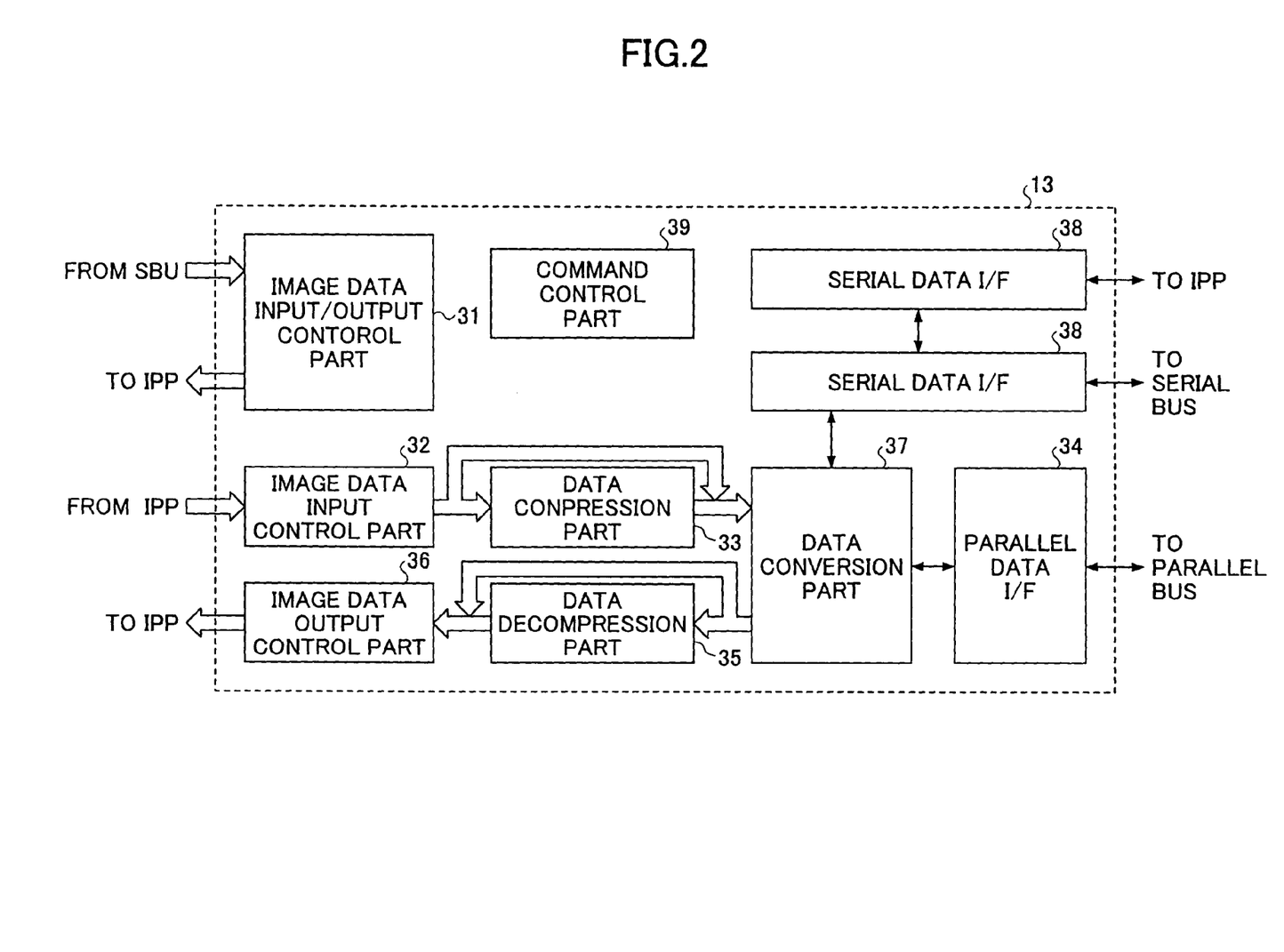
FIG. 2 shows a block diagram of a CDIC.
Figure 3:
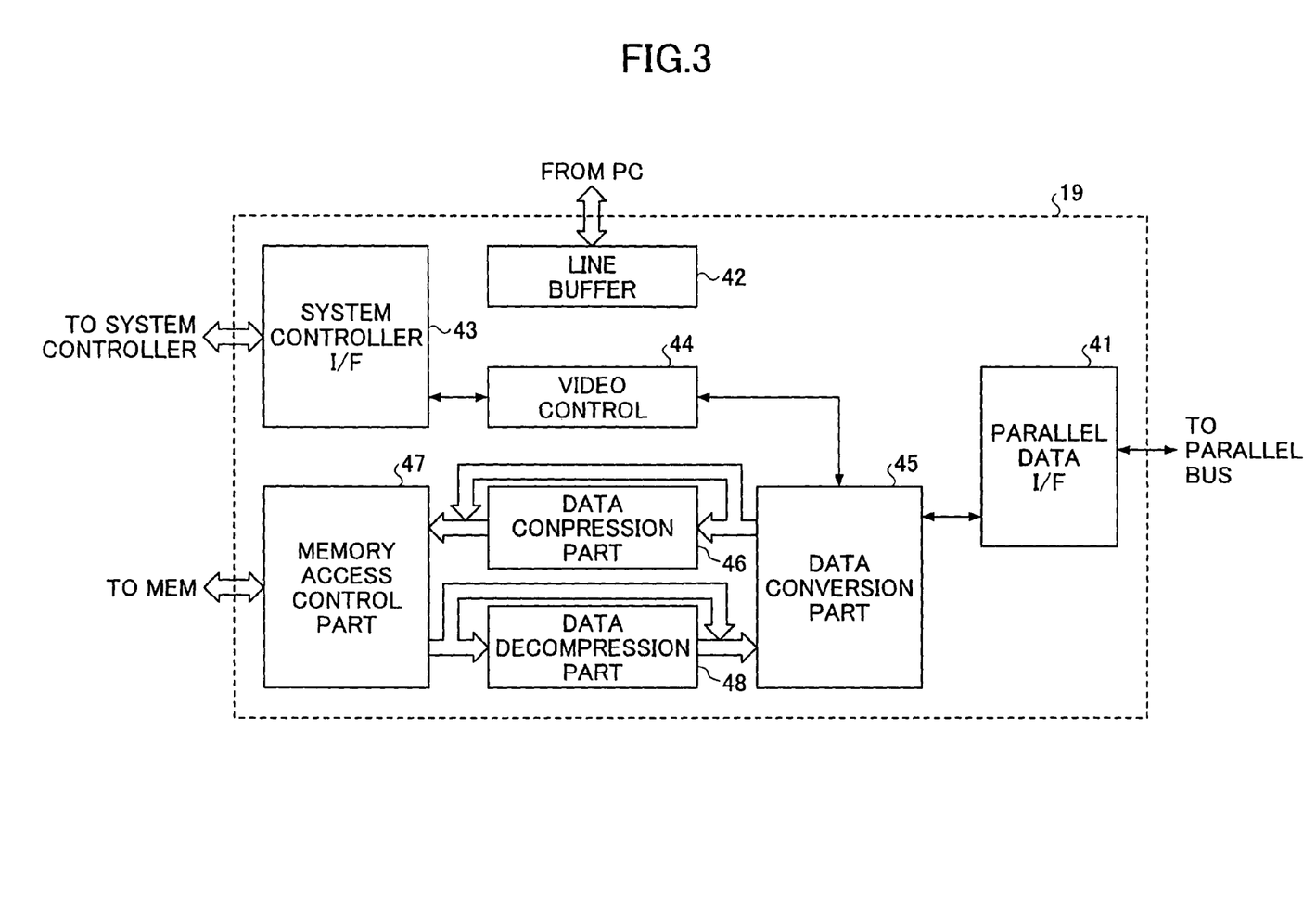
FIG. 3 shows a block diagram of an IMAC.
Figure 4:
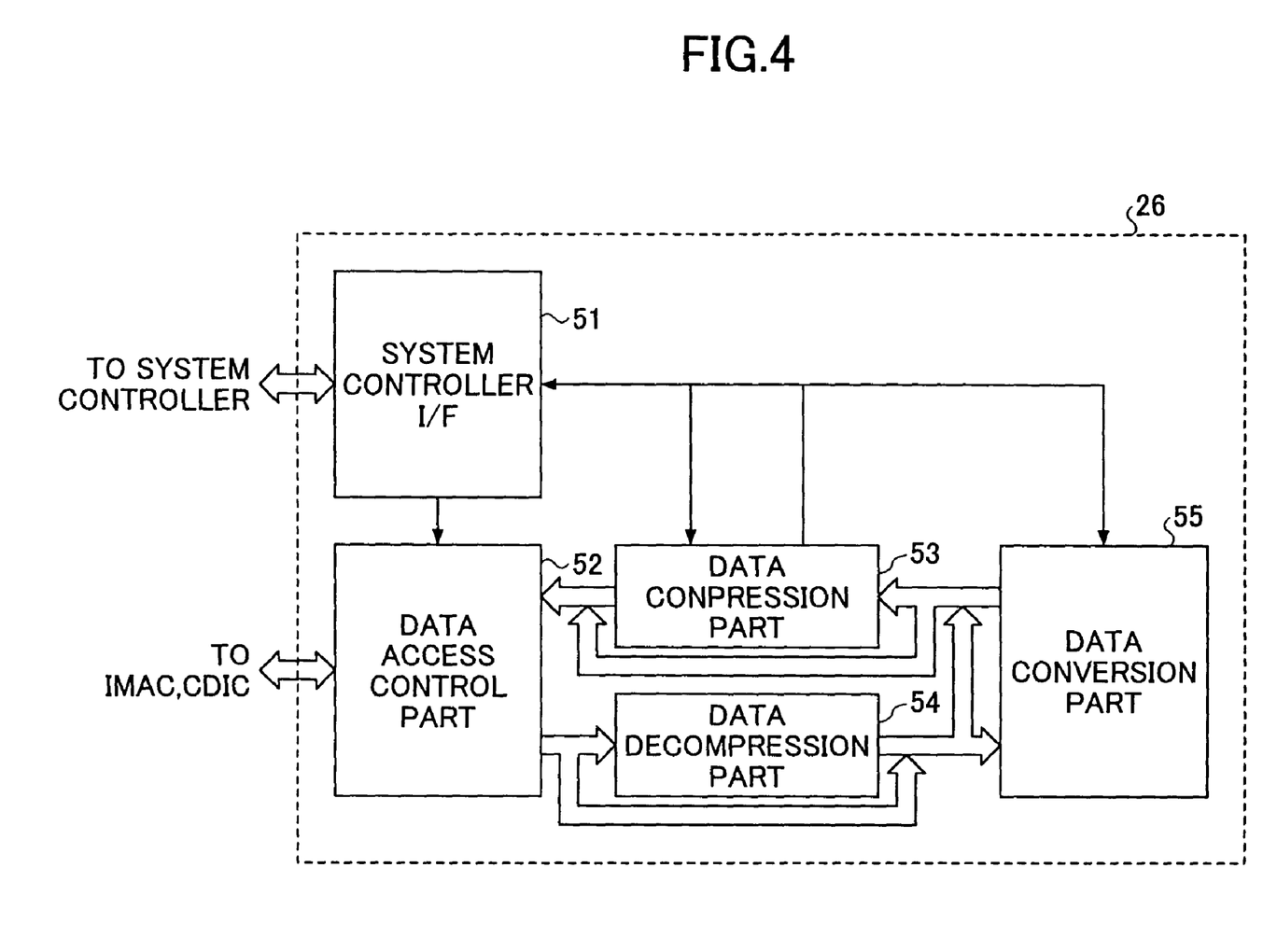
FIG. 4 shows a block diagram of an MLC.

FIG. 2 through FIG. 4 show block diagrams of the CDIC 13, the IMAC 19 and the MLC 26, respectively.

As shown in FIG. 2, in the CDIC 13, an image data input/output control part 31 receives the image data from the SBU 12 and supplies the image data to the IPP 15. The image data that is scanner-image-corrected by the IPP 15 is supplied to an image data input control part 32. The input data is compressed by a data compression part 33 to raise the transmission efficiency on the parallel bus 14 when it is desired or needed. The input data is transmitted to the parallel bus 14 through a parallel data I/F 34. If the image data that is input from the parallel bus 14 through the parallel data I/F 34 is compressed for transmission on the bus, the compressed data is decompressed by a data decompression part 35 when it is desired or needed. The decompressed image data is transferred to the IPP 15 by an image data output control part 36. An example of one of optimum encoding methods to be used for compression/decompression in the data compression part 33 and the data decompression part 35 of the copying apparatus is the encoding method that employs a fixed code length. This encoding method is suitable for the copying apparatus. In the encoding method that uses the fixed code length, it is possible to reproduce parts of the image because the original image before on which the encoding is performed can be located in the codes. Further, the encoding method is suitable for image processing and editing.

The CDIC 13 has a function for converting between parallel data and serial data. The system controller 16 transfers data to the parallel bus 14 and the process controller 27 transfers data to the serial bus 25. A data conversion part 37 converts data for communication between the two controllers 16 and 27. Two serial data I/Fs 38 are provided, one of which is provided for interfacing with the IPP 15. A command control part 39 controls various kinds of commands.

As shown in FIG. 3, the IMAC 19 manages an interface of the image data between the parallel bus 14 and the IMAC 19 by a parallel data I/F 41. The IMAC 19 controls storing/reading of the image data to and from the MEM 20 and mainly develops the input code data supplied from the external PC 21 to the image data. Examples of the MEM 20 are a semiconductor memory, a hard disk or both. Input data supplied from the PC 21 is locally stored in a line buffer 42. The code data stored in the line buffer 42 is developed into image data in the video control part 44 according to a development processing command supplied from the system controller 16 through the system controller I/F 43. The developed image data or the image data supplied from parallel bus 14 through the parallel bus I/F 41 is stored in the MEM 20. In this case, the image data to be stored is selected by a data conversion part 45 and the selected data is compressed by a data compression part 46 to raise the memory efficiency when it is desired or needed. Then, the image data is stored in the MEM 20 by a memory access control part 47 while addresses of the MEM 20 are being controlled. While the image data stored in the MEM 20 is being read, the memory access control part 47 controls the read address, and the read data is decompressed by a data decompression part 48 when it is desired or needed. An example of an encoding method used for compression and decompression in the data compression part 46 and the data decompression part 48 is a high efficient encoding method suitable for saving memory area in the MEM 20. This encoding method is different from, for example, the high functional encoding method that is used for the CDIC 13 as described above, as this encoding method is a high efficient encoding method. When the decompressed image data is transferred to the parallel bus 14, the decompressed image data is transferred through the parallel data I/F 41.

As shown in FIG. 4, in the MLC 26, the system controller I/F 51 controls a data access control part 52, a data compression part 53, a data decompression part 54 and a data conversion part 55 according to a process instruction from the system controller 16. The data access control part 52 inputs and/or outputs the data to be code-converted between the IMAC 19 and the CDIC 13. For example, the MLC 26 stores e data in the MEM 20 through the IMAC 19 and reads data from the MEM 20 through the IMAC 19. The original image data is reproduced from the input data by the data decompression part 54 when it is desired or needed. A data conversion such as scaling is performed on the reproduced image data by the data conversion part 55. The encoding process is performed on the converted data by the data compression part 53 in order to form data having an output code format when it is desired or needed. The new code data is output from the data access control part 52. If the data is not the encoded data, then the process of the data decompression part 54 is not performed. However, the data to be output is not the encoded data, then the process of the data compression part 53 is not performed. Further, it is possible to output the code data processed by the MLC 26 to the PC 21 through the IMAC 19.

Figure 5:
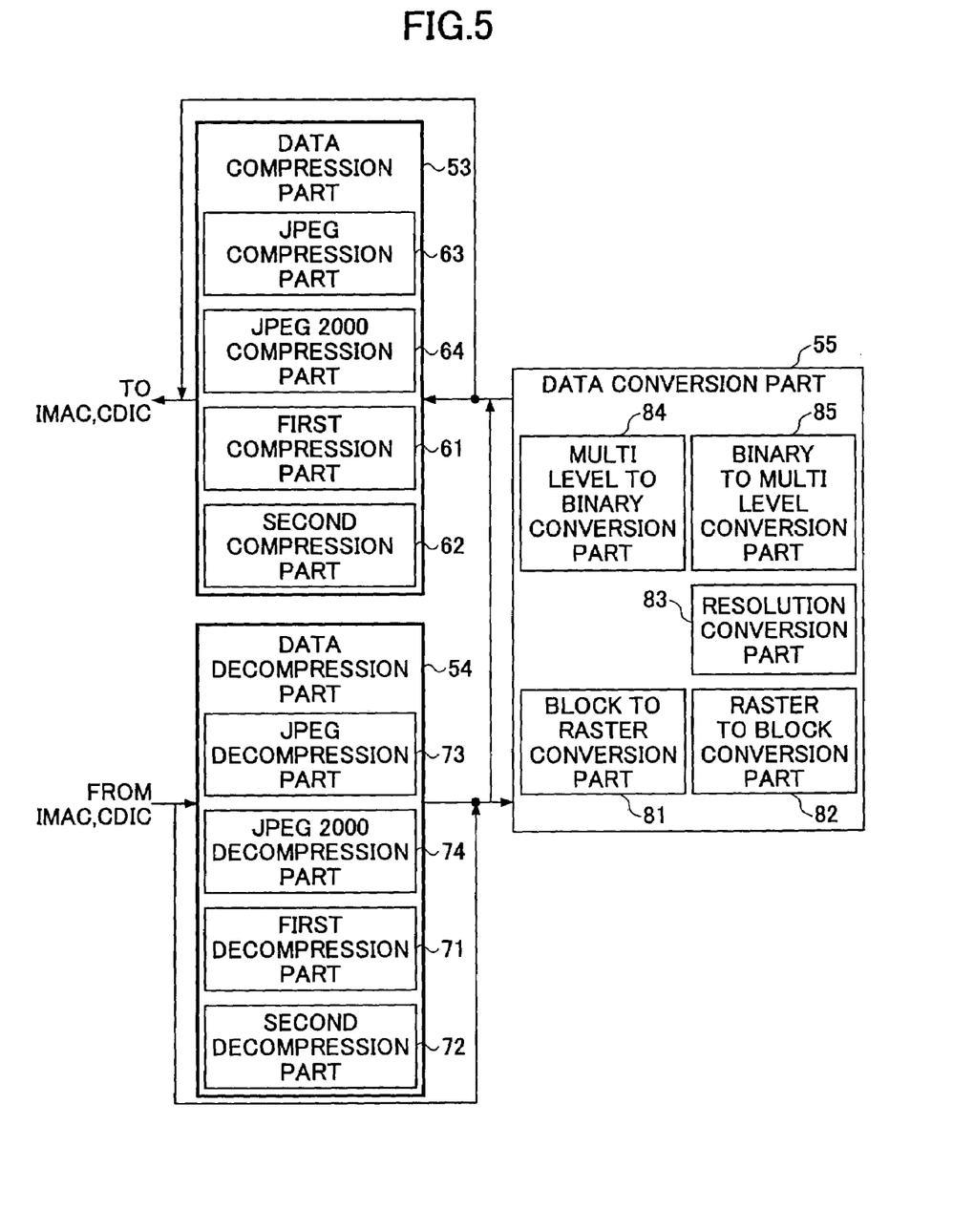
FIG. 5 shows a block diagram of a data compression part, a data decompression part and a data conversion part of the MLC.

FIG. 5 shows a block diagram of an embodiment of the data compression part 53, the data decompression part 54 and the data conversion part 55 of the MLC 26. As mentioned above, the desired encoding method for the CDIC 13 is different from the desired encoding method for the IMAC 19 and the dedicated encoding formats for the copying apparatus 1 are provided, respectively. An encoding format to be used in the CDIC 13 is called the first dedicated format and an encoding format to be used in the IMAC 19 is called the second dedicated format in this specification.

The data compression part 53 has a function of compressing data into codes having various kinds of formats. In this embodiment, for example, a first compression part 61 compresses data into a code having the first dedicated format, a second compression part 62 compresses data into a code having the second dedicated format, a JPEG compression part 63 compresses data into a code having the JPEG format and a JPEG 2000 compression part 64 compresses data into a code having the JPEG 2000 format.

The data decompression part 54 has a function of decompressing data having various kinds of formats. In this embodiment, for example, a first decompression part 71 decompresses the code having the first dedicated format, a second decompression part 72 decompresses the code having the second dedicated format, a JPEG decompression part 73 decompresses the code having the JPEG format and a JPEG 2000 decompression part 74 decompresses the code having the JPEG 2000 format.

The data conversion block 55 has a block-to-raster conversion part 81 that converts image data having a block format into image data having a raster format, a raster-to-block conversion part 82 that converts image data having a raster format into image data having a block format, a resolution conversion part 83 that performs conversion of the resolution of image data, a multi level-to-binary conversion part 84 that converts multi level image data into binary image data, and a binary-to-multi level conversion part 85 that converts binary image data into multi level image data.

As a result, it is possible to decompress code data having various kinds of formats in the data decompression part 54, to perform a predetermined conversion of the decompressed data in the data conversion part 55 and to encode the converted data into the data having a predetermined format in the data compression part 53.

For example, when the code having the JPEG 2000 format is converted into the first dedicated format, first, the code having the JPEG 2000 format is decompressed in the JPEG 2000 decompression part 74. Because the decompressed image data in the JPEG 2000 decompression part 74 is multi level image data having a block format, next, the decompressed image data is converted into image data having the raster format in the block-to-raster conversion part 81. If the first dedicated format is the binary image encoding format, then the image data having the raster format is converted into the binary image data in the multi level-to-binary conversion part 84. Then, the binary data is compressed into data having the first dedicated format in the first compression part 61.

In this construction, because the data stored in the MEM 20 is decompressed in the data decompression part 48, the data conversion part 55 can convert the data, and then the converted data can be compressed into the data having the JPEG format in the JPEG compression part 63 in the data compression part 53. As a result, the data having the JPEG format can be supplied to the PC 21, which constructs the output means, and the PC 21 can get the data to be easily handled. Therefore, it is possible to present the image on the display of the PC 21.

Furthermore, in the JPEG compression part 63 in the data compression part 53 of the MLC 26, the code data that is encoded by means of the reversible encoding method using the JPEG 2000 format can be converted into the code data that is encoded by means of the irreversible encoding method using the JPEG 2000 format or, the code data that is encoded by means of the irreversible encoding method using the JPEG 2000 format can be converted into the code data that is encoded by means of the reversible encoding method using the JPEG 2000 format. In the JPEG 2000 system, because it is possible to select the reversible or irreversible encoding methods in the same processing method for encoding the data, the conversion from the data encoded with one encoding method into the data encoded with another encoding method can be easily achieved using simple construction. For example, it is possible to use the data that is encoded with the reversible encoding method using the JPEG 2000 format in the CDIC 13 and to use the data that is encoded with the irreversible encoding method using the JPEG 2000 format in the IMAC 19. It is also possible to use the data that is encoded with the reversible encoding method using the JPEG 2000 format in the IMAC 19 and to convert the data that is encoded with the reversible encoding method using the JPEG 2000 format into the data that is encoded with the irreversible encoding method using JPEG 2000 format when the data is supplied to the PC 21.

It is also possible to manage the storage apparatus, such as the MEM 20, using the MLC 26 as follows.

Figure 6:
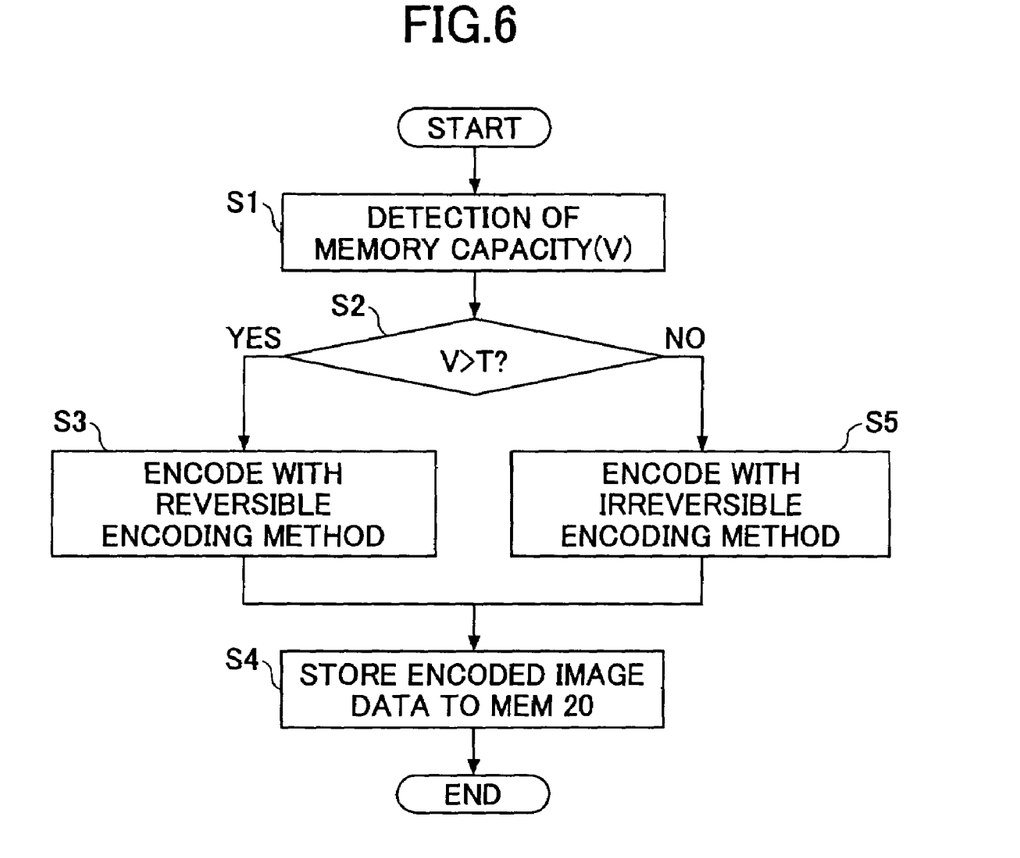
FIG. 6 shows a flow chart of a process for storing image data in an MEM.

FIG. 6 shows a flow chart of a process for storing data in the MEM 20. As shown in FIG. 6, when the system controller 16 stores image data in the MEM 20, the system controller 16 detects a memory capacity V of the MEM 20 (at a step S1).

Then, the memory capacity V is compared with a predetermined threshold value T (at a step S2). If the memory capacity V is greater than the threshold value T (at Y of the step S2), then the system controller 16 sets the MLC 26 so that the reversible encoding method is used to encode the image data, the image data is encoded with the reversible encoding method at the MLC 26 (at a step S3) and the IMAC 19 stores the encoded image data in the MEM 20 (at a step S4). If the memory capacity V is smaller than or equal to the threshold value T (at N of the step S2), the system controller 16 sets the MLC 26 so that the irreversible encoding method, such as the irreversible encoding method using the JPEG 2000 format, is used to encode the image data, the image data is encoded with the irreversible encoding method at the MLC 26 (at a step S5) and the IMAC 19 stores the encoded image data to the MEM 20 (at a step S4). The code storage means is achieved by, for example, the process as shown in FIG. 6.

According to the process, it is possible to store the optimal image while the data capacity of the MEM 20 is being saved because the encoding method is selectable according to the memory capacity of the MEM 20. If the copying apparatus 1 has a hard disk apparatus as well as the semiconductor memory, such as the MEM 20, it is possible to perform the same process to the hard disk apparatus as the process being performed to the MEM 20.

Figure 7:
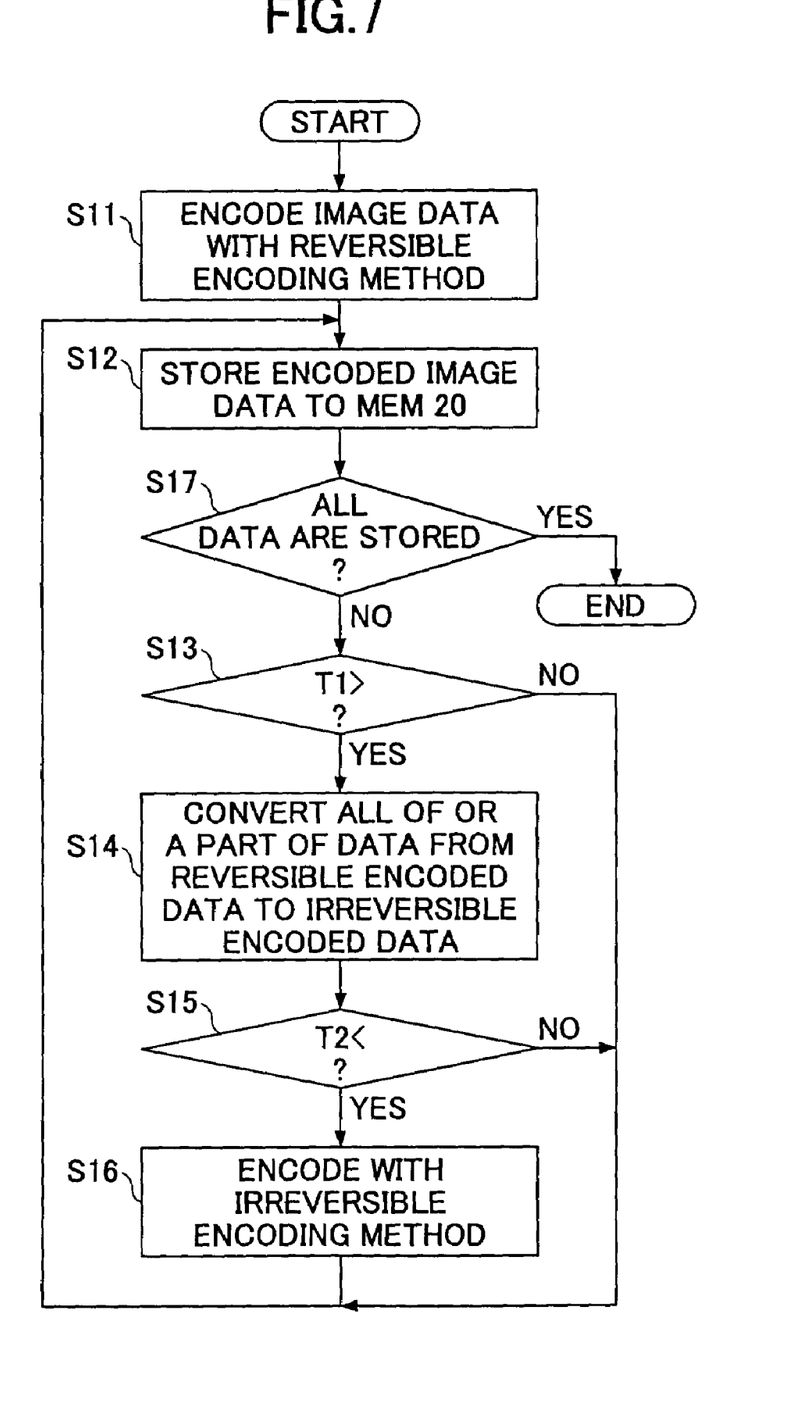
FIG. 7 shows another flow chart of a process for storing image data in the MEM.

Instead of the process as shown in FIG. 6, it is possible to perform the process as shown in FIG. 7. When the system controller 16 stores image data in the MEM 20, first, the system controller 16 sets the MLC 26 to encode the image data with a predetermined reversible encoding method, such as the reversible encoding method using the JPEG 2000 format, then the MCL 26 encodes the image data with the reversible encoding method (at a step S11) and the IMAC 19 stores the encoded data in the MEM 20 (at a step S12). Next, when the unused memory space of the MEM 20 is smaller than the predetermined threshold value T1 and therefore it is decided that the MEM 20 becomes full (at Y of a step S13), the system controller 16 stops the process in the step S12 and also stops storing more data into the MEM 20. Then, the MLC 26 encodes all of or a part of the data, which was encoded with the reversible encoding method in the MEM 20, with the irreversible encoding method, such as the irreversible encoding method using the JPEG 2000 format (at a step S14). When the unused memory space of the MEM 20 becomes larger than a predetermined threshold value T2 (T2>T1) (at Y of a step S15), then the system controller 16 sets the MLC 26 to encode with the irreversible encoding method, such as the irreversible encoding method using the JPEG 2000 format, at a step S16 and the system controller 16 restarts the MLC 26 to store the code data into the MEM 20 (at the step S12). After the code data are stored (at Y of a step S17), the process is finished. The step S11 and the step S12 achieve the first code storage means, the step S13 and the step S14 achieve the rewrite means, and the step S15 and the step S16 achieve the second code storage means.

When the process is performed, for example, as described above, it is possible to make memory space in the storage area in the MEM 20 without deleting the stored codes from the storage area in the MEM 20 because the encoding method that can encode the images with a highest quality is selected and the encoded codes are stored in the MEM 20 until the MEM 20 becomes full, and if the MEM 20 becomes full, the stored codes are converted to the code encoded with the irreversible encoding method and the remaining images are encoded with the irreversible encoding method and stored in the MEM 20.

Figure 8:
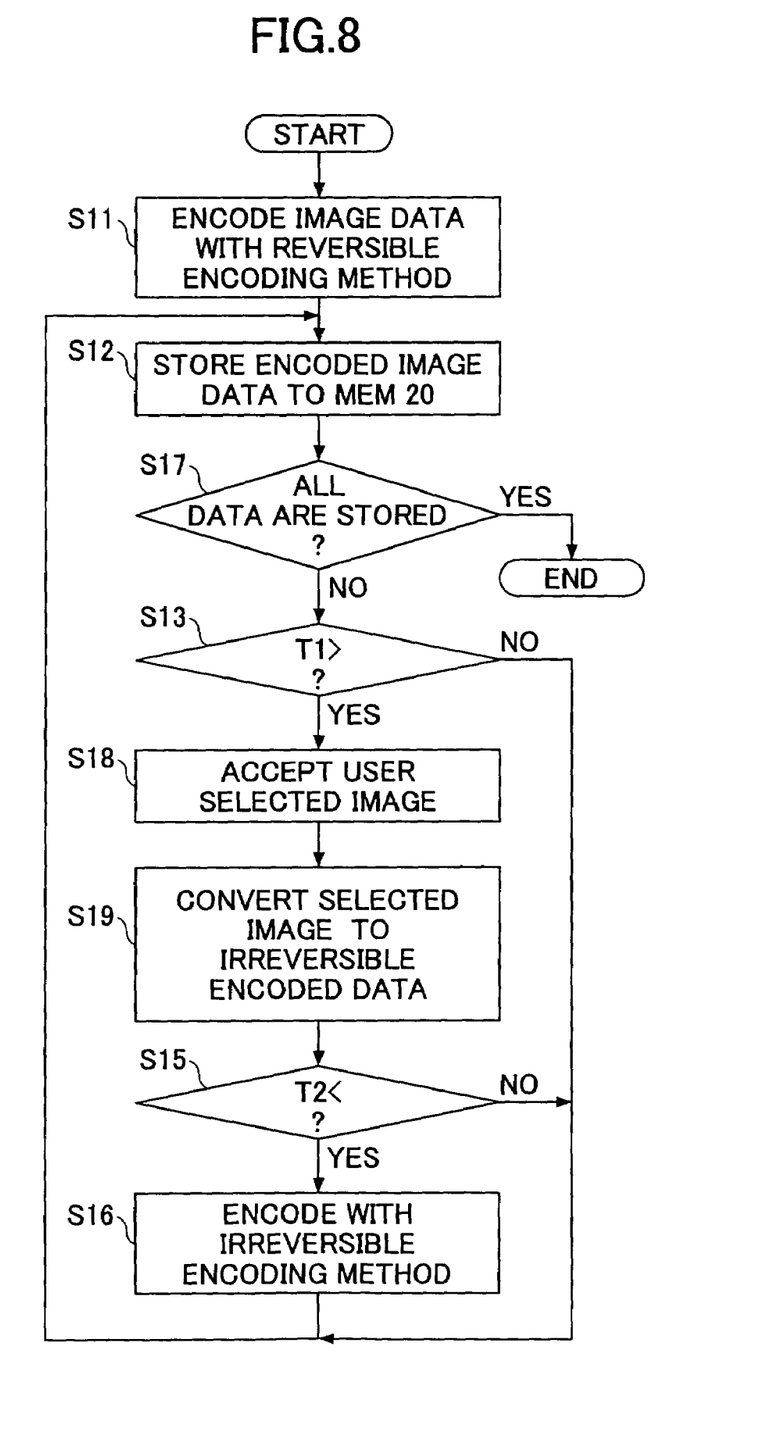
FIG. 8 shows another flow chart of a process for storing image data in the MEM.
Figure 9:
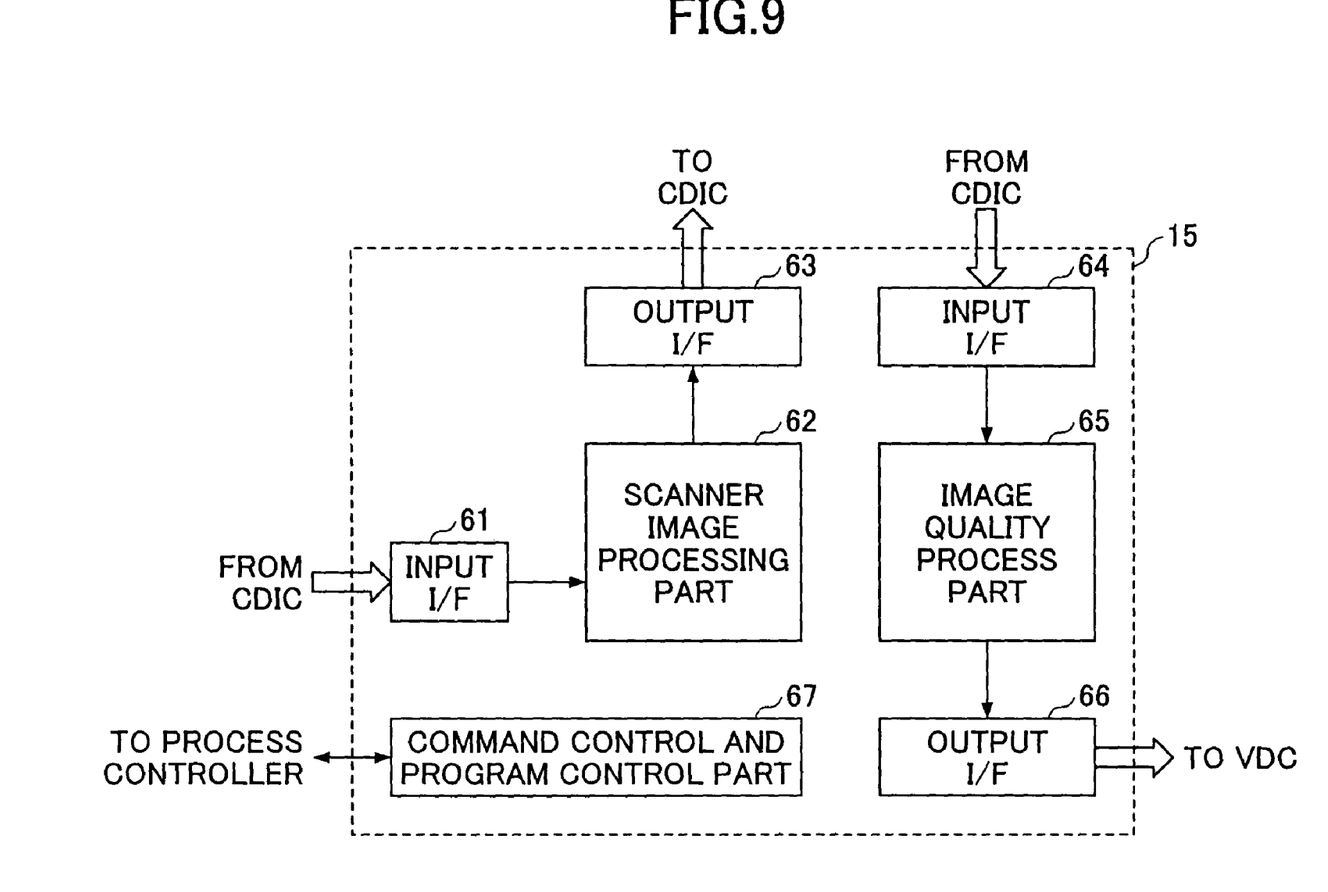
FIG. 9 shows a block diagram of an IPP.

It is also possible to add steps S18 and S19 after the Y-path of step S13 as shown in FIG. 9, instead of the step S14 as shown in FIG. 7. Referring to FIG. 8, when the MEM 20 becomes full, the system controller 16 displays a question on a display of the operational panel to select images to be converted into the images encoded with the irreversible encoding method from stored images that was encoded with the reversible encoding method in the MEM 20, and prompts a user to select the image to be converted (at the step S18). Then, the system controller 16 sets the MLC 26 to encode the selected image by the user with the irreversible encoding method, such as the irreversible encoding method using the JPEG 2000 format (at the step S19). As a result, it is possible to store the images having the optimal quality that the user desires. The step S18 achieves the acceptance means.

FIG. 9 shows a block diagram of the IPP 15. The read image is transferred to a scanner image processing part 62 from an input I/F 61 of the IPP 15 through the SBU 12 and the CDIC 13. The processes performed by the scanner image processing part 62 are, for example, a shading correction, a scanner gamma correction, an MTF correction, for example, to correct the degradation of the read image signal. Scaling processes, such as enlargement and reduction of the image, which are not the correction processes, may also be performed. After the correction processes for the read images are finished, the image data is transferred to the CDIC 13 through the output I/F 63. The image data supplied from the CDIC 13 is received by an input I/F 64 and the tone reproduction process by density of each element is performed in an image quality process part 65 to form the output to the transfer paper. Then, the data processed by the tone reproduction process by density of each element is supplied to the VDC 17 through an output I/F 66 as the output to the transfer paper. The examples of the tone reproduction processes by density of each element are the density conversion, the dither process and the error diffusion process in that the approximation of the tone by density of each element is mainly performed. Once the image data that the scanner image process is performed to is stored in the memory, it is possible to reproduce and review various kinds of images if the image quality process can be replaced. For example, impression of the reproduced image can be changed by changing the density of the reproduced image or the number of lines of the dither matrices. It is not needed to read the image again by the reading unit and it is sufficient to repeatedly read the stored image data from the MEM 20 to repeatedly perform the different processes to the same image data. In case of a stand alone scanner, both the scanner image processing and the tone process are performed to the image data and the data is supplied to the CDIC 13. A command control and program control part 67 performs control operation according to the various kind of commands.

Next, the second embodiment of the present invention will be explained.

Figure 10:
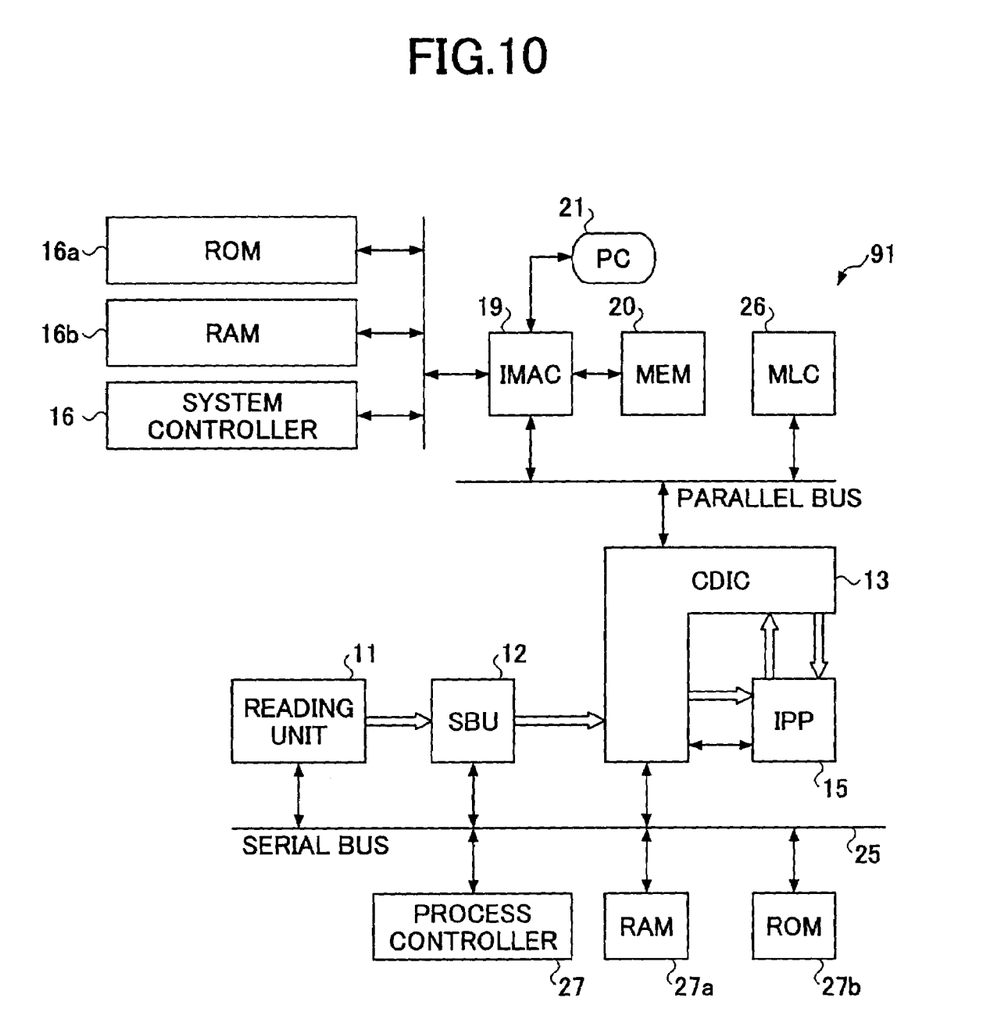
FIG. 10 shows a block diagram of an image reading apparatus of a second embodiment of the present invention.

FIG. 10 shows a block diagram which shows a electrical connection among elements in an image reading apparatus 91 of the second embodiment of the present invention. In FIG. 10, components having the same reference numerals as shown in FIG. 1 represent the same components of the first embodiment of the present invention. Therefore, the description of such component is omitted. The difference between the reading apparatus 91 as shown in FIG. 10 and the copying apparatus 1 as shown in FIG. 1 is that the image forming part 18 is not provided in the reading apparatus 91. The VCD 17 is also not provided in the reading apparatus 91 because the image forming part 18 is not provided.

The image data read by the reading unit 11 is digitized in the SBU 12 and transferred to the IPP 15 through the CDIC 13, and then a predetermined image process is performed on the transferred image data. In the predetermined image process, the correction of the degradation for the read image is mainly performed and furthermore, the tone process suitable for a display apparatus having a display also is performed. In the image reading apparatus, these processes are frequently different from the processes performed in the copying apparatus 1 that prints out the image on a transfer paper. When the IPP 15 is a programmable processing apparatus, a required process procedure from the image quality process procedure for printing the image on the transfer paper and the tone process procedure for displaying the image on the display, for example, are only needed to be loaded on the IPP 15. In this case, the IPP 15 may not be needed to have both the image quality process procedure and the tone process procedure.

After the tone process is performed on the image data, the image data is transferred to the CDIC 13 and is further transferred to the IMAC 19 through the parallel bus 14 from the CDIC 13. The IMAC 19 uses the MEM 20 as a buffer memory for the image data and transfers the image data to a driver running on the PC 21. As a result, the scanner function is achieved. As described in the first embodiment of the copying apparatus 1, the system controller 16 and the process controller 27 also manage the image data and the system resources.

According to the present invention, it is possible to provide a conversion with a simple construction and a simple process, because it is possible to change a compression method between a reversible compression method and an irreversible compression method in the same process method when a conversion between data compressed using a reversible compression method of the JPEG2000 format and data compressed using an irreversible compression method of the JPEG2000 format is performed.

According to the present invention, it is possible for the external computer to easily use the image data because the image data is converted to the standard format and is output externally.

According to the present invention, it is possible to store the optimal image while the data capacity of the storage apparatus is being saved because the encoding method is selectable according to a memory capacity of the storage apparatus.

According to the present invention, it is possible to make a memory space in the storage apparatus without deleting the stored codes from the storage apparatus because the encoding method that can encode the images with a highest quality is selected and the encoded codes are stored until the storage apparatus becomes full, and if the storage apparatus becomes full, the stored codes are converted into the data encoded with the irreversible compression method and the remaining images are encoded with the irreversible compression method and stored in the storage apparatus.

According to the present invention, it is possible to optimally save image data according to the user preference.

According to the present invention, it is possible to achieve an image reading apparatus that has the same effects as described herein.

According to the present invention, it is possible to achieve an image forming apparatus that has the same effects as described herein.

The present invention is not limited to the specifically disclosed embodiments, and variations and modifications may be made without departing from the scope of the present invention.

The present application is based on Japanese priority application No. 2002-239665 filed on Aug. 20, 2002, the entire contents of which are hereby incorporated by reference.

What is claimed is:

1. An image processing apparatus for processing image data, comprising:
a compression/decompression part for compressing said image data into code data having a plurality of kinds of formats and decompressing said code data into said image data, said plurality of kinds of formats comprise at least a reversible encoding method and an irreversible encoding method of a JPEG 2000 format; and
a conversion part for performing a conversion of a format of said code data from one format in said plurality of kinds of data formats to another format in said plurality of kinds of data formats using said compression/decompression part, said conversion comprises a conversion of said format of said code data from said reversible encoding method into said irreversible encoding method or from said irreversible encoding method into said reversible encoding method of said JPEG 2000 format.

2. The image processing apparatus as claimed in claim 1, further comprising:
an output part for externally outputting said code data having said format converted by said conversion part.

3. The image processing apparatus as claimed in claim 1, wherein said image processing apparatus is in communication with a storage apparatus for storing image data, the image processing apparatus further comprising:
a code storage part for storing said code data in said storage apparatus, wherein said code storage part causes said compression/decompression part to encode said image data with the reversible encoding method into said code data and stores said code data in said storage apparatus if a memory capacity of said storage apparatus is greater than a predetermined threshold value, and said code storage part causes said compression/decompression part to encode said image data with the irreversible encoding method into said code data and stores said code data in said storage apparatus if said memory capacity of said storage apparatus is less than or equal to said predetermined threshold value.

4. The image processing apparatus as claimed in claim 2, wherein said image processing apparatus is in communication with a storage apparatus for storing image data, the image processing apparatus further comprising:
a code storage part for storing said code data in said storage apparatus, wherein said code storage part causes said compression/decompression part to encode said image data with the reversible encoding method into said code data and stores said code data in said storage apparatus if a memory capacity of said storage apparatus is greater than a predetermined threshold value, and said code storage part causes said compression/decompression part to encode said image data with the irreversible encoding method into said code data and stores said code data in said storage apparatus if said memory capacity of said storage apparatus is less than or equal to said predetermined threshold value.

5. The image processing apparatus as claimed in claim 1, wherein said image processing apparatus is in communication with a storage apparatus for storing image data, the image processing apparatus further comprising:
a first code storage part for storing said code data in said storage apparatus, wherein said first code storage part causes said compression/decompression part to encode said image data stored in said storage apparatus with the reversible encoding method into said code data and stores said code data in said storage apparatus;

a rewrite part that stops said first code storage part and converts a format of said code data stored in said storage apparatus into a format of said code data corresponding to said irreversible encoding method using said conversion part if unused memory space of said storage apparatus is less than a first predetermined threshold value, after said first code storage part started storing; and a second code storage part for storing said code data in said storage apparatus, wherein said second code storage part restarts said compression/decompression part to encode a remaining part of said image data with the irreversible encoding method into said code data and stores said code data in said storage apparatus if said unused memory space of said storage apparatus is greater than a second predetermined threshold value that is greater than said first predetermined threshold value, after said rewrite part started converting.

6. The image processing apparatus as claimed in claim 2, wherein said image processing apparatus is in communication with a storage apparatus for storing image data, the image processing apparatus further comprising:

a first code storage part for storing said code data in said storage apparatus, wherein said first code storage part causes said compression/decompression part to encode said image data stored in said storage apparatus with the reversible encoding method into said code data and stores said code data in said storage apparatus;

a rewrite part that stops said first code storage part and converts a format of said code data stored in said storage apparatus into a format of said code data corresponding to said irreversible encoding method using said conversion part if unused memory space of said storage apparatus is less than a first predetermined threshold value, after said first code storage part started storing; and a second code storage part for storing said code data in said storage apparatus, wherein said second code storage part restarts said compression/decompression part to encode a remaining part of said image data with the irreversible encoding method into said code data and stores said code data in said storage apparatus if said unused memory space of said storage apparatus is greater than a second predetermined threshold value that is greater than said first predetermined threshold value, after said rewrite part started converting.

7. The image processing apparatus as claimed in claim 5, further comprising:

an acceptance part for accepting a selection for selecting an image data that is desired by a user from said image data stored in said storage apparatus if said unused memory space of said storage apparatus is smaller than said first predetermined threshold value, after said first code storing part started storing, and said rewrite part converts a format of said image data stored in said storage apparatus that is selected according to said selection accepted by said acceptance part into a format of said image data corresponding to said irreversible encoding method using said conversion part.

8. The image processing apparatus as claimed in claim 6, further comprising:

an acceptance part for accepting a selection for selecting an image data that is desired by a user from said image data stored in said storage apparatus if said unused memory space of said storage apparatus is smaller than said first predetermined threshold value, after said first code storing part started storing, and said rewrite part converts a format of said image data stored in said storage apparatus that is selected according to said selection accepted by said acceptance part into a format of said image data corresponding to said irreversible encoding method using said conversion part.

9. An image reading apparatus comprising:

a photoelectric conversion device that reads an image of a document;

a storage apparatus that stores image data of said read image of the document; and the image processing apparatus as claimed in claim 1 that processes at least a part of image data that is input to said image reading apparatus and output from said image reading apparatus.

10. An image reading apparatus comprising:

a photoelectric conversion device that reads an image of a document;

a storage apparatus that stores image data of said read image of the document; and the image processing apparatus as claimed in claim 2 that processes at least a part of image data that is input to said image reading apparatus and output from said image reading apparatus.

11. An image reading apparatus comprising:

a photoelectric conversion device that reads an image of a document;

a storage apparatus that stores image data of said read image of the document; and the image processing apparatus as claimed in claim 3 that processes at least a part of image data that is input to said image reading apparatus and output from said image reading apparatus.

12. An image reading apparatus comprising:

a photoelectric conversion device that reads an image of a document;

a storage apparatus that stores image data of said read image of the document; and the image processing apparatus as claimed in claim 4 that processes at least a part of image data that is input to said image reading apparatus and output from said image reading apparatus.

13. An image reading apparatus comprising:

a photoelectric conversion device that reads an image of a document;

a storage apparatus that stores image data of said read image of the document; and the image processing apparatus as claimed in claim 5 that processes at least a part of image data that is input to said image reading apparatus and output from said image reading apparatus.

14. An image reading apparatus comprising:

a photoelectric conversion device that reads an image of a document;

a storage apparatus that stores image data of said read image of the document; and the image processing apparatus as claimed in claim 6 that processes at least a part of image data that is input to said image reading apparatus and output from said image reading apparatus.

15. An image reading apparatus comprising:

a photoelectric conversion device that reads an image of a document;

a storage apparatus that stores image data of said read image of the document; and the image processing apparatus as claimed in claim 7 that processes at least a part of image data that is input to said image reading apparatus and output from said image reading apparatus.

16. An image reading apparatus comprising:
a photoelectric conversion device that reads an image of a document;
a storage apparatus that stores image data of said read image of the document; and
the image processing apparatus as claimed in claim 8 that processes at least a part of image data that is input to said image reading apparatus and output from said image reading apparatus.

17. An image forming apparatus comprising:
the image reading apparatus as claimed in claim 9; and
a printer engine that forms an image that is read by said photoelectric conversion device on a paper.

18. An image forming apparatus comprising:
the image reading apparatus as claimed in claim 10; and
a printer engine that forms an image that is read by said photoelectric conversion device on a paper.

19. An image forming apparatus comprising:
the image reading apparatus as claimed in claim 11; and
a printer engine that forms an image that is read by said photoelectric conversion device on a paper.

20. An image forming apparatus comprising:
the image reading apparatus as claimed in claim 12; and
a printer engine that forms an image that is read by said photoelectric conversion device on a paper.

21. An image forming apparatus comprising:
the image reading apparatus as claimed in claim 13; and
a printer engine that forms an image that is read by said photoelectric conversion device on a paper.

22. An image forming apparatus comprising:
the image reading apparatus as claimed in claim 14; and
a printer engine that forms an image that is read by said photoelectric conversion device on a paper.

23. An image forming apparatus comprising:
the image reading apparatus as claimed in claim 15; and
a printer engine that forms an image that is read by said photoelectric conversion device on a paper.

24. An image forming apparatus comprising:
the image reading apparatus as claimed in claim 16; and
a printer engine that forms an image that is read by said photoelectric conversion device on a paper.

* * * * *